United States Patent [19]
Bachmann et al.

[11] Patent Number: 4,963,220
[45] Date of Patent: Oct. 16, 1990

[54] ADHESIVE SYSTEM UTILIZING METAL ION-CONTAINING ACTIVATOR

[75] Inventors: Andrew G. Bachmann, Harwinton; Robert F. Bickley, Middlebury, both of Conn.

[73] Assignee: Dymax Corporation, Torrington, Conn.

[21] Appl. No.: 346,249

[22] Filed: May 1, 1989

Related U.S. Application Data

[63] Continuation of Ser. No. 147,286, Jan. 22, 1988, abandoned.

[51] Int. Cl.$^5$ .................... C09J 175/16; C09J 5/04
[52] U.S. Cl. .................... 156/307.3; 156/310; 525/14; 525/17; 525/30; 525/245; 525/263; 525/404; 525/454; 525/455; 525/456; 525/518
[58] Field of Search .................. 525/455, 456, 14, 17, 525/30, 245, 263, 404, 511, 518, 530, 454; 526/147, 208; 156/307.3, 310

[56] References Cited

U.S. PATENT DOCUMENTS

| | | | |
|---|---|---|---|
| 1,780,334 | 11/1930 | Burnett et al. | |
| 2,895,950 | 7/1959 | Krieble | 260/89.5 |
| 3,591,438 | 7/1971 | Toback et al. | 156/310 |
| 3,890,407 | 6/1975 | Briggs, Jr. et al. | 260/878 R |
| 4,118,436 | 10/1978 | Craven | 525/308 |
| 4,348,503 | 9/1982 | Bachmann | 525/455 |
| 4,429,088 | 1/1984 | Bachmann | 525/455 |
| 4,432,829 | 2/1984 | Bachmann | 525/455 |
| 4,632,944 | 12/1986 | Thompson | 522/11 |
| 4,632,945 | 12/1986 | Garcia et al. | 523/176 |

OTHER PUBLICATIONS

Chatfield, *Varnish Constituents*; 1953, pp. 548–549.
Chemical Abstracts Description of Registered Substances 13395-16-9 and 123-54-6.

Primary Examiner—John C. Bleutge
Assistant Examiner—David Buttner
Attorney, Agent, or Firm—Ira S. Dorman

[57] ABSTRACT

A composition providing a two-part adhesive consists of an acrylate monomer and perester catalyst, comprising the polymerizable part, and a ferric ion-accelerated butyraldehyde/aniline activator comprising the other.

27 Claims, No Drawings

ADHESIVE SYSTEM UTILIZING METAL ION-CONTAINING ACTIVATOR

This is a continuation of co-pending application Ser. No. 07/147,286 filed on Jan. 22, 1988, now abandoned.

BACKGROUND OF THE INVENTION

Reactive acrylic adhesives are well-known in the art, and are widely utilized due to the numerous advantageous characteristics that they exhibit. Curing of such adhesives may be activated by various chemical initiators, and although compositions are commercially available which react at high rates of speed, increased reactivity will generally be regarded to be advantageous, and will in fact be a fundamental criterion (together of course with appropriate adhesive, chemical and physical properties) for certain applications, such as high-speed, assembly line manufacturing operations.

More particularly, it is known in the art (see for example Bachmann U.S. Pat. No. 4,348,503) that curing of polymerizable acrylate compositions can be effected by use of amine/aldehyde condensation products of the kind that are commercially available from the R. T. Vanderbilt Company, Inc. under the designations VANAX 808 (butyraldehyde/aniline) and VANAX 833 (butyraldehyde/monobutylamine). Bachmann also discloses that ions of iron and other metals can be incorporated into the adhesives thereof, in amounts of 50 to 500 ppm based upon the weight of adhesive, and that it will generally be preferable to introduce the metal in an oxidized valence state.

The same patent indicates the commercial availability of a product, based upon the "833" adduct, which contains a small amount of copper salt, and teaches that the material will not generally be used with the compositions of the patent because of the general preference of incorporating the metal activator in the adhesive formulation. Finally, Bachmann disclosed that, when previously employed for anaerobic acrylate adhesives, ions of iron, copper, manganese, and the like were invariably furnished in admixture with the amine/aldehyde adduct.

Toback et al. U.S. Pat. No. 3,591,438 also teaches the use of the same class of chemical accelerators for curing polymerizable acrylate compositions, either a sulphur-containing free radical accelerator or a compound containing an oxidizable transition metal being incorporated as a reducing activator. According to the patentees, the preferred transition metals are iron, copper, cobalt, nickel and manganese, and they teach that the presence of the transition metal in the lower oxidation state appears to be the essential characteristic, albeit that compounds containing metal atoms which appear in the fully-oxidized state are said to work acceptably in the bonding accelerators of the invention. Toback et al. define the preferred ratio of condensation product:activator to be in the range 0.5–20:1, with little if any benefit being realized otherwise; i.e., they teach the use of about 66.7 to 4.6 percent of the reducing activator, based upon the total mixture. Also, the data set forth in Table Three of the patent appears to indicate that, from the standpoint of achieving the fastest fixture times, the butyraldehyde-butylamine condensation product is more effective than is the butyraldehyde-aniline adduct (compare Sample Nos. 9 and 10).

Despite the activity in the art indicated by the foregoing, a need exists for a reactive acrylate composition which is capable of high-speed curing under both aerobic and anaerobic conditions to produce an adhesive solid having highly advantageous characteristics, utilizing a chemical activator to initiate the curing reaction.

Accordingly, it is the broad object of the present invention to provide a novel, chemically activated, polymerizable acrylate system which is capable of curing under either aerobic or anaerobic conditions, and that cures at high rates of speed to produce a highly effective solid adhesive material.

It is also an object of the invention to provide such a system wherein chemical activation is effected by use of an amine/aldehyde condensation product.

Another object is to provide a novel method for bonding surfaces utilizing such an acrylate system.

SUMMARY OF THE INVENTION

It has now been found that certain of the foregoing and related objects of the invention are readily attained by the provision of a two-part, chemically activated adhesive system including, in combination, an adhesive formulation and a chemical activator formulation. The adhesive formulation comprises at least one polymerizable acrylate monomer, at least one elastomeric domain-providing filler, and a perester catalyst in an amount sufficient, when activated, to effectively initiate polymerization of the monomer. The chemical activator formulation comprises an aldehyde/amine condensation product capable of activating the perester catalyst to initiate polymerization of the monomer, and about 0.001 to 0.5 percent, based upon the weight of the activator formulation, of a metal accelerator selected from the group consisting of ferric ion, cupric ion and ferrous ion.

In the preferred embodiments the accelerator will be present in an amount not exceeding 0.1 weight percent of the activator formulation, and the amine/aldehyde condensation product will be produced by reacting the aldehyde with an aromatic amine. Most desirably, the accelerator will be the ferric ion, and the amine/aldehyde product will be produced by reacting a stoichiometric excess of butyraldehyde with aniline.

The perester catalyst will preferably be either tertiary-butyl perbenzoate or tertiary-butyl perocotoate, and the adhesive formulation will advantageously include about 0.5 to 5.0 percent by weight of an organic acid (usually maleic) which is capable of cyclic tautomerism (as more fully described in the aforesaid Bachmann patent), and about 2.0 to 6.0 weight percent of acrylic acid. It will also be advantageous to employ, as the acrylate monomer, a compound selected from the group consisting of isobornyl acrylate, isobornyl methacrylate, hydroxyethyl methacrylate, hydroxypropyl methacrylate, polyethyleneglycol dimethacrylate, trimethylcyclohexyl acrylate, trimethylcyclohexyl methacrylate, benzyl methacrylate, butyleneglycol dimethacrylate, polybutyleneglycol dimethacrylate, and mixtures thereof, and as the elastomeric domain-providing filler an acrylated polyurethane oligomer, especially a diisocyanate-capped polyether acrylated by reaction with hydroxyethyl acrylate or hydroxyethyl methacrylate, having a molecular weight of about 400 to 6,000. The monomer and elastomeric domain-providing filler will normally constitute about 30 to 60 and 5 to 60 weight percent, respectively, of the adhesive formulation.

Other objects of the invention are attained by the provision of a method for bonding surfaces to one another, utilizing a liquid adhesive formulation and chemical activator formulation, each composed as herein set forth. The adhesive formulation is applied to at least one of the surfaces to be bonded, and the activator formulation is applied to another; the surfaces are thereafter brought into intimate contact with one another and so maintained for a period of time sufficient to effect curing of the adhesive formulation to an adhesive solid. In the preferred embodiments of the method, curing will be carried out at room temperature and for a period of less than 15 seconds, and the specific ingredients of the formulations designated herein as preferred, most desirable or advantageous will be employed in the practice thereof.

DETAILED DESCRIPTION OF THE PREFERRED EMBODIMENTS

Exemplary of the efficacy of the present invention are the following examples:

Example One

A series of three adhesive formulations (A–C) are prepared from the ingredients set forth in Table One below, in the amounts specified (expressed in weight percentages). Oligomers I and II referred to therein are both acrylated polyurethane oligomers having molecular weights of about 400 and 4,000, respectively; HEMA is hydroxyethyl methacrylate monomer; IBOA is isobornyl acrylate monomer; TBPB is tertiary-butyl perbenzoate catalyst; and the modifiers referred to are thickeners, adhesion promoters, stabilizers, and the like, all of which are conventionally used in adhesives of this kind.

Fixture rate tests are carried out by applying a drop of each formulation to a glass slide, which is then covered with a second slide to which has been applied a chemical activator formulation; distribution of the formulations and intimate contact between them is effected by application of finger pressure. As noted in the Table, two forms of the same activator (VANAX 808, butyraldehyde/aniline adduct, about 16.3 weight percent active ingredient in solvent) are used, the difference residing in the incorporation of about 0.15 percent by weight, based upon the amount of the condensation product, of ferric ion (added as the acetylacetonate) where designated. Gentle to and from force is applied to the slides along the shear plane, and the period (in seconds) that elapses, from initial contact to the point that movement no longer occurs, is noted in each instance.

In a second series of tests, one-gram aliquots of each of the foregoing adhesive formulations are mixed with five drops of the VANAX 808 activator solution, with and without the ferric ion accelerator at the 0.15 percent level. The time required (in seconds) for polymerization to occur is observed in each instance, and is noted in Table One.

TABLE ONE

|  | A | B | C |
|---|---|---|---|
| Ingredients |  |  |  |
| Oligomer I |  |  | 39.0 |
| Oligomer II | 29.0 | 39.0 |  |
| HEMA | 20.0 |  | 49.5 |
| IBOA | 39.5 | 49.5 |  |
| TBPB | 3.0 | 3.0 | 3.0 |
| Modifiers | 2.0 | 2.0 | 2.0 |
| Acrylic Acid | 5.0 | 5.0 | 5.0 |
| Maleic Acid | 1.5 | 1.5 | 1.5 |
| Test Results |  |  |  |

TABLE ONE-continued

|  | A | B | C |
|---|---|---|---|
| Fixture Time Activator Alone | 23 | 17 | 15 |
| Fixture Time Activator + $Fe^{+3}$ | 12 | 7 | 11 |
| Polymerization Time Activator Alone | 24 | 12 | 8 |
| Polymerization Time Activator + $Fe^{+3}$ | 13 | 6 | 5 |

From the foregoing data it can be seen that, in all instances, the presence of the ferric ion effects at least a substantial decrease in the adhesive fixture time, and in two cases it reduces the time to about half, or less, that which is required when the unmodified activator is used. The ferric ion is seen to produce similar results in the polymerization tests.

For comparison, a commercially available anaerobic acrylate adhesive (believed to contain cumene hydroperoxide as the catalyst) is used in a parallel series of experiments in which curing is attempted with the same activator, both with and without ferric ion modification at the 0.15% concentration level. It is found that in no instance is curing achieved within four minutes' time, after which the tests are terminated.

Example Two

The polymerization experiment described in Example One is repeated, utilizing however amounts of ferric sulfate (normally thought of as not soluble) and ferric acetylacetonate sufficient to provide, respectively, 0.001 and 0.01 percent (by weight of the active VANAX 808 adduct) of ferric ion. In both instances substantial increases in cure rates are observed. Further testing utilizing a sufficiently soluble cupric compound shows a comparable, albeit diminished result.

Example Three

The polymerization experiment is again carried out, utilizing adhesive formulation "C", and soluble metal compounds admixed with the VANAX 808 activator in amounts sufficient to provide concentrations of 0.001, 0.01 and 0.1 percent of either the cuprous, the cobaltic or the manganic ions. The cuprous and manganic ions are found to be virtually ineffective for increasing cure rate of the adhesive; the cobaltic ion is also seen to be virtually ineffective, or to have an adverse effect.

As will be appreciated by those skilled in the art, the metal ion may be introduced into the activator as virtually any compatible, and adequately soluble, organic or inorganic compound. For example, the ferric ion may be provided by incorporating into the activator ferric sulfate, ferric chloride or ferrocene; more soluble compounds such as ferric acetylacetonate are however preferred. Corresponding cupric and ferrous salts may be used when those ions are to be present. It will also be appreciated that solubilizing agents for the metal compounds may be employed in appropriate circumstances.

Although the metal ions taught for use herein may show an accelerating effect in combination with many of the amine/aldehyde condensation products that are known in the art for curing acrylate monomers, particularly desirable results are attained when the amine moiety of the condensation product is aromatic, and most especially when it is aniline; other aromatic amines that may be of comparable advantage are ethylaniline and o-toluidine. Similarly, while a variety of different aldehydes may be employed to produce the activator, n-butyraldehyde is perhaps most often used and results in an especially effective product when condensed with aniline; other of the aldehydes that are known for use in producing such adducts may however be found to be suitably substituted.

In addition to judicious selection of the reactants used, other factors evidently significantly affect the properties of the condensation product. More particularly, it is believed to be important that the condensation reaction be carried out with a substantial stoichiometric excess of the aldehyde compound (typically at least two, and as many as seven, moles of the aldehyde per mole of the amine), and that it be effected in the presence of an acid, including acid anhydrides and the like. Maintaining conditions in which water is eliminated from the reaction mixture during condensation is believed to contribute to the effectiveness of the product, as well.

Additional details of the reactions that appear to be optimal for producing the amine/aldehyde products that are most effective for use herein are disclosed in Burnett et al. U.S. Pat. No. 1,780,334, the specification of which is hereby incorporated hereinto by reference thereto. It is believed that the VANAX 808 product is produced from butyraldehyde and aniline in the manner described therein.

The acrylate monomer employed in the instant compositions will generally be a reaction product of acrylic acid and/or methacrylic acid with one or more mono- or polybasic, substituted or unsubstituted, alkyl ($C_1$ to $C_{18}$), aryl or aralkyl alcohols. Preferred acrylates will often be those in which the alcohol moiety contains a polar substituent (e.g., an hydroxyl, amine, halogen, cyano, heterocyclic or cyclohexyl group), since cross-linking or other intermolecular bonding is promoted thereby. General disclosure of suitable acrylic ester monomers are provided in the prior art, such as in U.S. Pat. Nos. 3,218,305 (line 65, column 1 through line 47, column 2); 3,425,988 (line 49, column 2 through line 21, column 3); 3,651,036 (line 69, column 1 through line 12, column 2); 3,658,624 (line 74, column 1 through line 58, column 2); 3,826,756 (line 49, column 2 through line 5, column 3); and 3,855,040 (line 20, column 3 through line 55, column 4), which portions of the foregoing specifications are hereby incorporated by reference into this specification. It is believed that the choice of appropriate ester monomers will be evident to those skilled in the art, and that further generalized description thereof will therefore be unnecessary.

Nevertheless, it might be pointed out that specific acrylates which can advantageously be employed, alone or in combination, include (in addition to the HEMA and IBOA used in the foregoing Examples) the tetraethyleneglycol, isodecyl and hydroxyethyl esters of acylic acid; the butyl, isodecyl, methyl, tetrahydrofurfuryl, isobornyl, and dicyclopentadienyl esters of methacrylic acid; diacrylates, triacrylates and tetracrylates (i.e., the polyacrylic and polymethacrylic esters) of butyleneglycol, triethyleneglycol, tetraethyleneglycol, polyethylene glycol, bisphenol A, pentaerythritol (particularly the triacrylate ester), trimethylcyclohexyl acrylate, and the like.

Turning now more specifically to the filler, virtually any material that is soluble (to at least a significant degree) in the monomer fraction, and that serves to toughen, flexibilize and/or strengthen the cured adhesive, may be used. The filler need not be introduced as a rubbery solid; liquids and waxy substances are also entirely suitable. It is most desirable that the filler be reactive with the monomeric components to produce intermolecular bonding, since that will enhance compatibility and tend to maximize the ultimate properties of the adhesive. In any event, it is believed that the effective fillers toughen or otherwise desirably modify the adhesive by dispersing in the monomer formulation to provide elastomeric domains; generally, they will be rubbery or elastomeric materials, thermoplastic polymers, or macromers.

Although the selection of specific appropriate elastomeric domain-providing fillers will be evident to those skilled in the art, it might be mentioned that typical suitable materials include Vinyl polymers, acrylic polymers, polyester elastomers, glycol polymers, acrylated epoxies, natural and synthetic rubbers, and the like. More particularly, fillers such as VINAC B-7 (polyvinyl acetate sold by Airco Chemical Company), polyethyleneglycol 6000, HYCAR CTBN and HYCAR 1022 (liquid rubbers sold by the B. F. Goodrich Chemical Company), X-80 (polyester oligomer sold by Union Carbide Corporation), and KM-229, KM-288 and KM-323B (acrylic elastomers sold by the Rohm & Haas Company) are advantageously used in the formulations of the invention.

In many instances, however, the urethane polymers and prepolymers will be preferred, with the latter being especially desirable due to the potential that they afford for further reaction of their pendant isocyanate groups with a reactive functionality (e.g., an hydroxyl group) provided by a suitable acrylate monomer. Typical specific urethane elastomers that are advantageously used include the rubber sold by B. F. Goodrich Chemical Company under the trade designation ESTANE 5730, and the prepolymers sold respectively by Witco Chemical Company and by N. L. Industries under the designations CASTOMER 0002 and VORITE. Particularly preferred are such urethanes capped with an acrylic monomer, e.g., the oligomers used in the foregoing Examples, and the polyacrylate esters of organic polyisocyanates described as "monomers" in the above-mentioned U.S. Pat. No. 3,425,988 (the portion of the disclosure thereof in column 2, line 35 through column 4, line 58 is hereby incorporated hereinto by reference). In view of all of the foregoing, however, it will be appreciated that the selection of a particular elastomeric domain-providing filler is not critical, and that the specific material used may vary widely, depending upon the application for, and the properties desired in, the adhesive.

The amount of filler utilized will depend upon several factors, including again the properties desired in the ultimate product, the nature of the components employed, and the like. Generally, at least about five weight percent will be employed, and in the preferred compositions the filler will usually constitute about 20 to 50 weight percent.

In addition to the principal components hereinabove described, it will be evident that other materials may also be incorporated into the instant compositions. For example, acrylic acid, used in the amounts indicated, is especially desirable from the standpoint of maximizing adhesion and curing rate; "inert" fillers, such as wood flour, glass fibers, cotton linters, mica, alumina, silica, and the like, are conventionally used to modify viscosity, improve impact resistance, and for other purposes, and they may be employed in the instant compositions if so desired. It is also conventional to include small percentages of silane monomers to increase moisture resistance as well as to enhance the bond strength of the adhesive to glass and similar surfaces. Other substances, such as dyes, fire retarders, stabilizers (e.g., the quinones and hydroquinones), thixotropes, thickeners, viscosity reducers, plasticizers, antioxidants, and the like, may additionally be incorporated, although it will be appreciated that such additives will often be furnished in the principal ingredients, making their separate introduction unnecessary.

Despite the fact that all of the compositions of the invention exhibit adhesive properties, it will of course be understood that they can be used for other purposes as well. For example, they may serve as coatings, for applications in which gap-filling is of primary importance, etc. Therefore, as will be evident from the context, in some instances the term "adhesives" is used herein as a convenience and is to be more broadly construed.

Thus, it can be seen that the present invention provides a novel polymerizable acrylate system which is chemically activated by use of an amine/aldehyde condensation product and which cures at high rates of speed, under either aerobic or anaerobic conditions, to produce a highly effective solid adhesive material. The invention also provides a novel method for bonding surfaces utilizing such an acrylate system.

What is claimed is:

1. As a two-part, chemically activated adhesive system, the combination including:
    an adhesive formulation that is polymerizable under both aerobic and anaerobic conditions, comprising at least one polymerizable acrylate monomer, at least one elastomeric domain-providing filler, about 0.5 to 5.0 percent by weight of an organic acid that is capable of cyclic tautomerism, and a perester catalyst in an amount sufficient, when activated, to effectively initiate polymerization of said monomer; and
    a chemical activator formulation comprising an aldehyde/amine condensation product capable of activating said perester catalyst to initiate polymeriztaion of said monomer, and 0.001 to 0.5 percent, based upon the weight of said activator formulation, of a metal accelerator selected from the group consisting of ferric ion, cupric ion and ferrous ion.

2. The system of claim 1 wherein said accelerator is the ferric ion.

3. The system of claim 2 wherein said accelerator is present in an amount not exceeding 0.1 weight percent of said activator formulation.

4. The system of claim 1 wherein said amine/aldehyde condensation product is produced by reacting the aldehyde with an aromatic amine.

5. The system of claim 4 wherein said product is produced by condensation of butyraldehyde with aniline.

6. The system of claim 5 wherein said product is chemically heterogeneous, and is produced by reaction of a substantial stoichiometric excess of butyraldehyde in the presence of an acid.

7. The system of claim 1 wherein said perester catalyst is selected from the class consisting of tertiary-butyl perbenzoate and tertiary-butyl peroctoate.

8. The system of claim 1 wherein said acid is maleic acid.

9. The system of claim 1 wherein said acrylate monomer is a compound selected from the group consisting of isobornyl acrylate, isobornyl methacrylate, hydroxyethyl methacrylate, hydroxypropyl methacrylate, polyethyleneglycol dimethacrylate, trimethylcyclohexyl acrylate, trimethylcyclohexyl methacrylate, benzyl methacrylate, butyleneglycol dimethacrylate, polybutyleneglycol dimethacrylate, and mixtures thereof.

10. The system of claim 9 wherein said elastomeric domain-providing filler is an acrylated polyurethane oligomer.

11. The system of claim 10 wherein said oligomer has a molecular weight of about 400 to 6000, and is a diisocyanate-capped polyether acrylated by reaction with hydroxyethyl acrylate or hydroxyethyl methacrylate.

12. The system of claim 11 wherein said monomer and elastomeric domain-providing filler constitute about 30 to 60 and 5 to 60 weight percent, respectively, of said adhesive formulation.

13. The system of claim 1 wherein said adhesive formulation additionally includes about 2.0 to 6.0 percent by weight thereof of acrylic acid.

14. As a two-part, chemically activated adhesive system, the combination including:
    an adhesive formulation that is polymerizable under both aerobic and anaerobic conditions, comprising at least one polymerizable acrylate monomer, at least one elastomeric domain-providing filler, about 0.5 to 5.0 percent by weight of an organic acid that is capable of cyclic tautomerism, and a perester catalyst in an amount sufficient, when activated, to effectively initiate polymerization of said monomer; and
    a chemical activator formulation comprising an aldehyde/amine condensation product capable of activating said perester catalyst to initiate polymerization of said monomer, and 0.001 to 0.5 percent, based upon the weight of said activator formulation, of ferric ion.

15. The system of claim 14 wherein said accelerator is present in an amount not exceeding 0.1 weight percent of said activator formulation.

16. The system of claim 14 wherein said acid is maleic acid is produced by condensation of butyraldehyde with aniline.

17. The system of claim 16 wherein said perester catalyst is selected from the class consisting of tertiary-butyl perbenzoate and tertiary-butyl peroctoate.

18. The system of claim 16 wherein said adhesive formulation additionally includes about 2.0 to 6.0 percent by weight thereof of acrylic acid.

19. The system of claim 16 wherein said acrylate monomer is a compound selected from the group consisting of isobornyl acrylate, isobornyl methacrylate, hydroxyethyl methacrylate, hydroxypropyl methacrylate, polyethyleneglycol dimethacrylate, trimethylcyclohexyl acrylate, trimethylcyclohexyl methacrylate, benzyl methacrylate, butyleneglycol dimethacrylate, polybutyleneglycol dimethacrylate, and mixtures thereof, and wherein said elastomeric domain-providing filler is an acrylated polyurethane oligomer having a molecular weight of about 400 to 6000, and is a diisocyanate-capped polyether acrylated by reaction with hydroxyethyl acrylate or hydroxyethyl methacrylate.

20. The system of claim 19 wherein said monomer and elastomeric domain-providing filler constitute about 30 to 60 and 5 to 60 weight percent, respectively, of said adhesive formulation.

21. In a method for bonding surfaces to one another, the steps comprising:
(a) providing a liquid adhesive formulation that is polymerizable under both aerobic and anaerobic conditions, comprising at least one polymerizable acrylate monomer, at least one elastomeric domain-providing filler, about 0.5 to 5.0 percent by weight of an organic acid that is capable of cyclic tautomerism, and a perester catalyst in an amount sufficient, when activated, to effectively initiate polymerization of said monomer;
(b) applying said adhesive formulation to at least one of the surfaces to be bonded;
(c) providing a chemical activator formulation comprising an aldehyde/amine condensation product capable of activating said perester catalyst to initiate polymerization of said monomer, and 0.001 to 0.5 percent, based upon the weight of said activator formulation, of a metal accelerator selected from the group consisting of ferric ion, cupric ion and ferrous ion;
(d) applying said activator formulation to another of the surfaces to be bonded; and
(e) bringing said one and another surface into intimate contact with one another and maintaining such contact for a period of time sufficient to effect curing of said adhesive formulation to an adhesive solid.

22. The method of claim 21 wherein said method is carried out at room temperature, and wherein said period of time is less than 15 seconds.

23. The method of claim 21 wherein said accelerator is the ferric ion, and is present in an amount not exceeding 0.1 weight percent of said activator formulation.

24. The method of claim 21 wherein said acid is maleic acid.

25. The method of claim 21 wherein said amine/aldehyde condensation product is chemically heterogeneous, and is produced by reaction of aniline with a substantial stoichiometric excess of butyraldehyde in the presence of an acid.

26. The method of claim 21 wherein said perester catalyst is selected from the class consisting of tertiarybutyl perbenzoate and tertiary-butyl peroctoate.

27. The method of claim 21 wherein said adhesive formulation additionally includes about 2.0 to 6.0 percent by weight thereof of acrylic acid, wherein said acrylate monomer is a compound selected from the group consisting of isobornyl acrylate, isobornyl methacrylate, hydroxyethyl methacrylate, hydroxypropyl methacrylate, polyethyleneglycol dimethacrylate, trimethylcyclohexyl acrylate, trimethylcyclohexyl methacrylate, benzyl methacrylate, butyleneglycol dimethacrylate, polybutyleneglycol dimethacrylate, and mixtures thereof, and wherein said elastomeric domain-providing filler is an acrylated polyurethane oligomer having a molecular weight of about 400 to 6000, and is a diisocyanate-capped polyether acrylated by reaction with hydroxyethyl acrylate or hydroxyethyl methacrylate, said monomer and elastomeric domain-providing filler constituting about 30 to 60 and 5 to 60 weight percent, respectively, of said adhesive formulation.

* * * * *

UNITED STATES PATENT AND TRADEMARK OFFICE
CERTIFICATE OF CORRECTION

PATENT NO. : 4,963,220

DATED : October 16, 1990

INVENTOR(S) : ANDREW G. BACHMANN ET AL

It is certified that error appears in the above-identified patent and that said Letters Patent is hereby corrected as shown below:

Claim 16, column 8, lines 47 and 48, delete the terminal portion of the claim beginning with the phrase "is produced".

Signed and Sealed this

Twenty-first Day of January, 1992

Attest:

HARRY F. MANBECK, JR.

*Attesting Officer*  *Commissioner of Patents and Trademarks*